(12) United States Patent
Emery

(10) Patent No.: US 10,181,720 B1
(45) Date of Patent: Jan. 15, 2019

(54) DUAL POLARITY HIGH VOLTAGE BLOCKING CIRCUIT FOR A PULSE INDUCTION METAL DETECTOR

(71) Applicant: David Lawrence Emery, Hilliard, FL (US)

(72) Inventor: David Lawrence Emery, Hilliard, FL (US)

( * ) Notice: Subject to any disclaimer, the term of this patent is extended or adjusted under 35 U.S.C. 154(b) by 31 days.

(21) Appl. No.: 15/641,065

(22) Filed: Jul. 3, 2017

Related U.S. Application Data

(60) Provisional application No. 62/361,615, filed on Jul. 13, 2016.

(51) Int. Cl.
*G01V 3/10* (2006.01)
*H02H 9/04* (2006.01)

(52) U.S. Cl.
CPC .............. *H02H 9/045* (2013.01); *G01V 3/10* (2013.01); *H02H 9/044* (2013.01)

(58) Field of Classification Search
CPC .......... G01V 3/10; G01V 3/104–3/107; H02H 9/44–9/45
USPC ............................................. 361/56; 324/329
See application file for complete search history.

(56) References Cited

U.S. PATENT DOCUMENTS

| 3,315,155 | A | * | 4/1967 | Colani | G01N 27/20 324/239 |
| 4,868,504 | A | * | 9/1989 | Johnson | G01V 3/104 324/329 |
| 5,414,411 | A | * | 5/1995 | Lahr | G01V 3/10 324/329 |
| 5,576,624 | A | * | 11/1996 | Candy | G01V 3/02 324/239 |
| 6,326,790 | B1 | * | 12/2001 | Ott | G01V 3/15 324/236 |
| 6,653,838 | B2 | * | 11/2003 | Candy | G01V 3/10 324/239 |
| 7,075,304 | B2 | * | 7/2006 | Nelson | G01V 3/104 324/326 |
| 7,176,691 | B2 | * | 2/2007 | Nelson | G01V 3/105 324/327 |
| 7,710,118 | B2 | * | 5/2010 | Emery | G01V 3/107 324/239 |
| 9,348,053 | B2 | * | 5/2016 | Candy | G01V 3/105 |

* cited by examiner

*Primary Examiner* — Albert K Wong

(57) ABSTRACT

A circuit uses a high voltage diode to automatically block high voltage flyback pulses of either polarity from the transmit coil of a pulse induction type metal detector from its sensitive receive circuitry. The circuit being fully automatic requires no control signals and permits the receive circuitry to sample the signal being received immediately following the termination of the flyback pulse.

10 Claims, 2 Drawing Sheets

DUAL POLARITY HIGH VOLTAGE BLOCKING CIRCUIT FOR A PULSE INDUCTION METAL DETECTOR

CROSS-REFERENCE TO RELATED APPLICATION

This application claims the benefit of provisional patent application No. 62/361,615, filed 2016 Jul. 13 by the present inventor.

BACKGROUND—PRIOR ART

The following is prior art that presently appears relevant:

| U.S. patents | | |
|---|---|---|
| Pat. No. | Publication Date | Patentee |
| 3315155 A | 1967 Apr. 18 | Colani |

BACKGROUND OF THE INVENTION

Pulse induction type metal detectors are well known in the art. A full discussion of the operating principles of a pulse induction metal detector is therefore not required and will not be given.

Pulse induction metal detectors switch a high current into a transmit coil arrangement for a period of time commonly between 50 μs and 250 μs. The current is abruptly switched off which causes the field in the transmit coil to collapse. The collapsing field generates a high voltage flyback pulse. The high voltage pulse can range, or be limited to, between the range of typically 200V to 1000V.

The signals are received by the detector circuitry by either the same coil that is used to transmit or from a separate receive coil. The received signals are measured in microvolts. The high voltage flyback pulse by necessity has to be isolated from the receive circuitry in order to avoid catastrophic damage.

Early pulse induction metal detectors used fast reed relays as transmit/receive or T/R switches. The relays worked to isolate the high voltage flyback signal but, due to their limited switching speed, metal detectors thus equipped could only sample the received signal after an excessively long delay time.

Most pulse induction metal detectors that date from the mid 1960's up until today use a resistor and back to back diodes to protect the sensitive receive circuitry from the high back EMF voltage known as the flyback voltage. The diodes limit the voltage to +/−one diode drop. Colani, in U.S. Pat. No. 3,315,155, described a simple high voltage protection method which used a resistor and a diode.

A severe limitation of this approach is that the resistor is a source of Johnson noise. The Johnson noise degrades the signal to noise ratio of the microvolt level signals being received. The resistor also dissipates a lot of power as heat as well as presenting a load to the transmit coil.

In the last twenty years at least one manufacturer of pulse induction metal detectors has used two field effect transistors to protect the receive circuitry. The method, although being an improvement, is far from ideal.

High voltage protection is further complicated in metal detectors that transmit pulses of alternating polarity as such protection circuitry has to be capable of a bipolar operation.

OBJECT OF THE INVENTION

It is an object of the invention to provide a low cost high voltage blocking circuit to protect the sensitive receive circuitry of a pulse induction type metal detector.

It is a further objective of the invention to provide a high voltage blocking circuit that preserves a low signal to noise ratio.

It is a still further object of the invention to provide a high voltage blocking circuit that allows the earliest possible sampling time of the received signal in the presence of very high voltage flyback signals.

It is a still further object of the invention to provide a high voltage blocking circuit that is fully automatic and does not require a control signal or signals to command its functions.

DETAILED DESCRIPTION OF THE INVENTION

Figure 2:
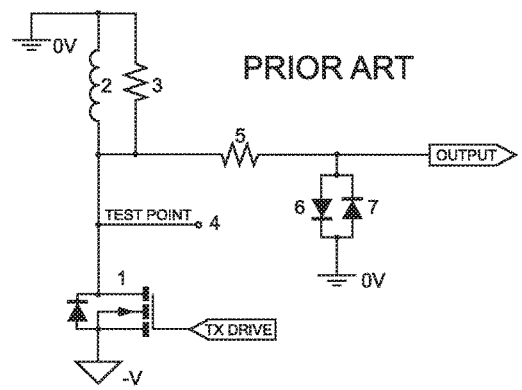
FIG. 2 is a first example of a prior art protection circuit that uses a resistor and diodes to limit the high voltage flyback pulses to +/−one diode drop.

Referring to FIG. 2

Figure 1:
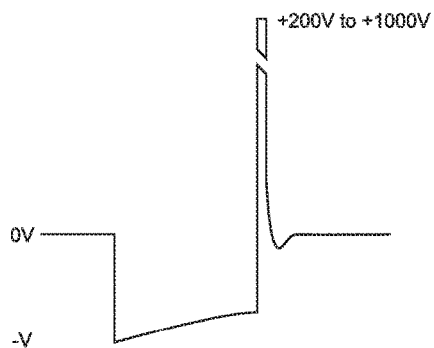
FIG. 1 is an example of a typical waveform from a pulse induction metal detector search coil. The positive terminal of the battery pack is connected to signal ground. The long negative transition is where the coil is switched from signal ground to the negative terminal of the battery pack. The high voltage flyback pulse is shown after the termination of the transmit period. It is this pulse that the circuitry of the present invention automatically blocks from the sensitive receive circuitry. The polarity of the pulse can be inverted or a series of pulses can be sequentially inverted.

The most common prior art method to protect the receive circuitry from the high voltage pulse is shown in FIG. 2. FET 1 switches transmit coil 2 between 0V and the negative supply rail. Coil 2 is critically damped by damping resistor 3. The waveform seen at test point 4 is illustrated in FIG. 1.

During the transmit period current flows through diode 7 through dropping resistor 5 to the negative supply rail. During the flyback pulse period diode 6 conducts though dropping resistor 5 to 0V. This limits the flyback pulse voltage to plus and minus one diode drop.

This is still the most common method used to protect the receive circuitry from the high voltage flyback pulse in a pulse induction metal detector. It has been in use for over a half century. While the method works, it has some serious shortcomings. The Johnson noise associated with the resistor degrades the signal to noise ratio which makes the detection of small metallic items such as small coins and gold nuggets very difficult.

Many designers of pulse induction metal detectors have opted to use very long integration of the receive signal in order to provide better sensitivity to these smaller items. The trade-off being that a very slow sweep speed of the search coil is required less the signals from such small items are missed.

Dropping resistor 5 also dissipates a lot of power as heat. This is especially true when the high voltage flyback pulses are above 300V.

Figure 3:
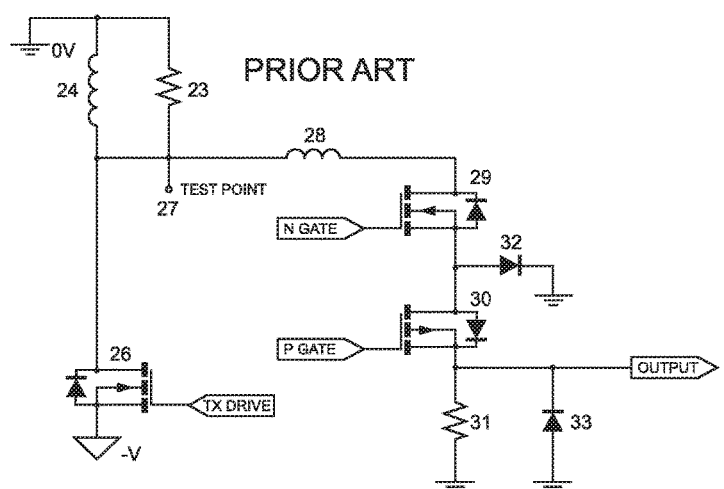
FIG. 3 is a second example of a prior art protection circuit that uses field effect transistors.

Referring to FIG. 3

FIG. 3 illustrates another prior art high voltage protection method that uses field effect transistors.

FET 26 switches transmit coil 24 between 0V and the negative supply rail. Coil 24 is critically damped by damping resistor 23. The waveform seen at test point 27 is illustrated in FIG. 1. The high voltage flyback pulse has its rise time slowed by inductor 28. NFET 29 is a high voltage type and is switched off by a negative going control signal during the flyback pulse period. PFET 30 is also turned off during the flyback pulse period by a positive going control signal. The PFET is used to block the negative going signal which has a path of conduction through the internal protection diode of NFET 29. Diodes 32 and 33 clamp the receive signal to signal ground. The capacitance of the FETs causes a delay in how fast the received signal can be sampled after the transmit pulse terminates. The FETs also require control switching signals to operate between the transmit and the receive mode. Different sizes and types of search coils provide a high voltage flyback signal with different widths. This demands that the control switching signals either be made variable or a compromise must be made in their timing to accommodate a range of different search coils.

Figure 4:
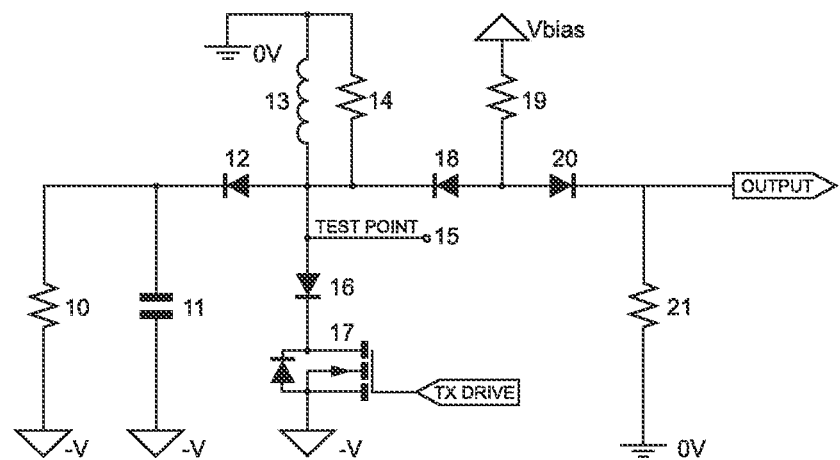
FIG. 4 is a circuit example of the present invention that uses a single coil for both transmit and receive.

Referring to FIG. 4

FIG. 4 illustrates a first embodiment of the present invention that is designed for use in pulse induction metal detectors that utilize the same coil for both transmit and receive. FET 17 is connected in series with Transmit coil 13 through diode 16. Diode 16 reduces the capacitance of the FET to the transmit coil. Transmit coil 13 is critically damped by Damping Resistor 14. Diode 12, Resistor 10 and High Voltage Capacitor 11 form an RCD snubber circuit which keeps the FET from avalanching. The waveform seen at test point 15 is illustrated in FIG. 1.

High Voltage Diode 18 is biased into conduction by Resistor 19. Diode 20 is also biased on though Resistor 19 and Resistor 21. At the end of the transmit period the high voltage flyback pulse reverse biases High Voltage Diode 18. The receive circuitry is immediately disconnected from the transmit coil due to the reverse bias caused by the high voltage flyback pulse. Diode 20 eliminates any negative transitions. Diode 20 also limits the current flow between 0V and the negative supply rail when FET 17 is switched on. The output of the circuit is applied to a coil preamplifier the output of which connects to the demodulation circuitry.

In one preferred embodiment no coil amplifier is used. The output of the circuit of FIG. 4 is applied directly to the demodulation circuitry. This provides the receive circuitry with a very wide dynamic range.

Figure 5:
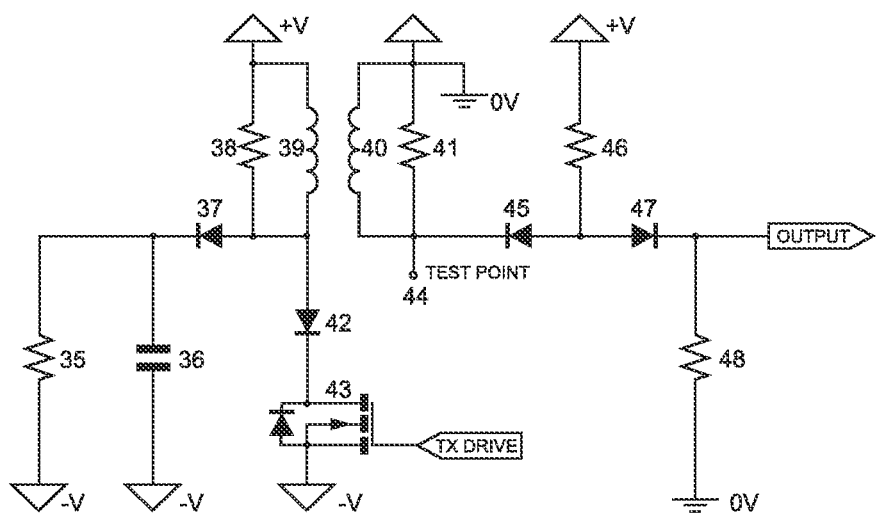
FIG. 5 is a circuit example of the present invention that uses a separate transmit and receive coil.

Referring to FIG. 5

FIG. 5 illustrates a second embodiment of the present invention that utilizes a separate receive coil. FET 43 is connected in series with Transmit Coil 39 through Diode 42. Diode 42 reduces the capacitance of the FET to the transmit coil. Transmit coil 39 is critically damped by Damping Resistor 38. Receive Coil 40 is critically damped by damping resistor 41. Diode 37, Resistor 35 and High Voltage Capacitor 36 form an RCD snubber circuit which keeps FET 43 from avalanching.

High Voltage Diode 45 is biased into conduction by Resistor 46. Diode 47 is also biased on though Resistor 46 and Resistor 48. At the end of the transmit period the high voltage flyback pulse reverse biases Diode 45. The receive circuitry is immediately disconnected from the transmit coil due to the reverse bias caused by the high voltage flyback pulse. Diode 47 eliminates the negative transition which could otherwise cause a problem. Diode 47 also limits the current flow between 0V and the negative supply rail when FET 43 is switched on. The output of the circuit is applied to a coil preamplifier the output of which connects to the demodulation circuitry. The waveform seen at test point 44 is illustrated in FIG. 1.

An advantage of this embodiment is that it is capable of the automatic protection of the receive circuitry from transmit pulses of either polarity.

Dual polarity pulse induction metal detectors are used in military demining operations. The dual polarity pulses they transmit average to a zero magnetic field to stop magnetic trigger mechanisms in some types of land mines from being activated by the magnetic field from the transmit coil of the metal detector.

The transmit and receive coils in one preferred embodiment are close wound together without any separation. The output of the circuit of one preferred embodiment is connected directly to the demodulator circuitry. No coil amplifier is used.

The circuit method of the present invention provides a vast improvement in the ability of the demodulation circuitry to sample the received signal earlier than has previously been possible due to the loading of the transmit coil. The circuitry is both simple and inexpensive as well as being fully automatic without the requirement for any control signals.

Of note is that the signal present at the test points of FIG. 2, FIG. 3, FIG. 4, and FIG. 5 can be squared and used to automatically trigger a demodulator sample gate to provide the earliest sample time of the receive signal for any particular search coil. A selectable automatic or manual timing function can be added to provide maximum a flexibility of operation.

What is claimed is:

1. A pulse induction metal detector with flyback voltage protection, comprising:
   a critically damped coil;
   a drive circuit to drive the critically damped coil in a transmit period wherein a flyback voltage is generated after the transmit period;
   a first and a second diode wherein the breakdown voltage of the diodes exceeds the maximum flyback voltage and wherein the anode of the diodes are connected together and the cathode of the first diode is connected to the critically damped coil and the cathode of the second diode is connected to an output; and
   a bias circuit to bias the first diode into a conductive state when the drive circuit is in the transmit period and into a reversed bias state from the flyback voltage.

2. The metal detector in claim 1, wherein the critically damped coil includes a resistor.

3. The metal detector in claim 1, wherein the drive circuit includes a transistor.

4. The metal detector in claim 1, wherein the bias circuit is a resistor divider.

5. The metal detector in claim 1, further comprising a preamplifier and demodulator connected to the output.

6. If A pulse induction metal detector with flyback voltage protection, comprising:
   a critically damped transmit coil;
   a drive circuit to drive the critically damped transmit coil in a transmit period, wherein a flyback voltage is generated after the transmit period;
   a critically damped receive coil;

a first and a second diode wherein the breakdown voltage of the diodes exceeds the maximum flyback voltage and wherein the anode of the diodes are connected together and the cathode of the first diode is connected to the receive coil and the a cathode of the second diode is connected to an output; and a bias circuit to bias the first diode into a conductive state when the drive circuit is in a transmit period and into a reversed bias state from the flyback voltage.

7. The metal detector in claim 6, wherein the critically damped transmit coil and the critically damped receive coil includes a resistor.

8. The metal detector in claim 6, wherein the drive circuit includes a transistor.

9. The metal detector in claim 6, wherein the bias circuit is a resistor divider.

10. The metal detector in claim 6, further comprising a preamplifier and demodulator connected to the output.

\* \* \* \* \*